US011107044B2

(12) United States Patent
Cheng et al.

(10) Patent No.: US 11,107,044 B2
(45) Date of Patent: Aug. 31, 2021

(54) REMOVE SELECTED USER IDENTIFIERS TO INCLUDE IN AN EVENT MESSAGE BASED ON A CONTEXT OF AN EVENT

(71) Applicant: International Business Machines Corporation, Armonk, NY (US)

(72) Inventors: Yi Chiao Cheng, Singapore (SG); David C. Reed, Tucson, AZ (US); Apoorva Sachdev, Singapore (SG); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 859 days.

(21) Appl. No.: 14/741,440

(22) Filed: Jun. 16, 2015

(65) Prior Publication Data
US 2016/0371655 A1    Dec. 22, 2016

(51) Int. Cl.
*G06Q 10/10* (2012.01)
*G06Q 50/00* (2012.01)

(52) U.S. Cl.
CPC ......... *G06Q 10/1095* (2013.01); *G06Q 50/01* (2013.01)

(58) Field of Classification Search
USPC ....................................................... 705/7.19
See application file for complete search history.

(56) References Cited

U.S. PATENT DOCUMENTS

| | | | |
|---|---|---|---|
| 7,283,970 B2 | 10/2007 | Cragun et al. | |
| 8,180,663 B2 | 5/2012 | Tischhauser et al. | |
| 8,346,590 B2 | 1/2013 | Norton et al. | |
| 2003/0191772 A1 | 10/2003 | Schaumann et al. | |
| 2006/0179114 A1* | 8/2006 | Deeds | H04M 1/2757 709/206 |
| 2007/0118415 A1 | 5/2007 | Chen et al. | |
| 2008/0147471 A1 | 6/2008 | Singh et al. | |
| 2009/0132329 A1 | 5/2009 | Lam et al. | |
| 2009/0157513 A1* | 6/2009 | Bonev | G06Q 10/109 705/14.69 |

(Continued)

OTHER PUBLICATIONS

Shakshuki et al., A Distributed Multi-Agent Meeting Scheduler, 2006, Elsevier, Journal of Computer and System Sciences 74, pp. 279-296 (Year: 2008).*

*Primary Examiner* — Brian M Epstein
*Assistant Examiner* — Allison M Neal
(74) *Attorney, Agent, or Firm* — Konrad Raynes Davda & Victor LLP; David W. Victor

(57) ABSTRACT

Provided are a computer program product, system, and method to remove selected user identifiers to include in an event message based on a context of an event. A determination is made of multiple user identifiers in a group of selected user identifiers for one event name for an event message for an event to schedule. A determination is made of a context of the event to schedule. At least one of the multiple user identifiers that are not included in at least one message with an event initiator that initiated the event to schedule, having a message context matching the determined context of the event to schedule, are removed from the group of selected user identifiers to produce a modified group of selected user identifiers. An event message is generated to transmit to addresses for the modified group of selected user identifiers with information on the event to schedule.

24 Claims, 8 Drawing Sheets

(56) References Cited

U.S. PATENT DOCUMENTS

| | | | |
|---|---|---|---|
| 2009/0165022 A1* | 6/2009 | Madsen | G06Q 10/109 |
| | | | 719/318 |
| 2010/0146058 A1 | 6/2010 | Naef | |
| 2012/0296982 A1 | 11/2012 | Heyman et al. | |
| 2013/0290435 A1* | 10/2013 | Martin | H04L 51/28 |
| | | | 709/206 |
| 2014/0006082 A1* | 1/2014 | Harms | G06Q 10/1095 |
| | | | 705/7.19 |
| 2014/0188541 A1* | 7/2014 | Goldsmith | G06Q 10/06 |
| | | | 705/7.19 |
| 2014/0249831 A1* | 9/2014 | Gallopyn | G16H 40/20 |
| | | | 705/2 |
| 2014/0372162 A1 | 12/2014 | Dhara et al. | |
| 2015/0006221 A1 | 1/2015 | Mermelstein | |
| 2016/0232625 A1* | 8/2016 | Akutagawa | H04L 51/20 |

\* cited by examiner

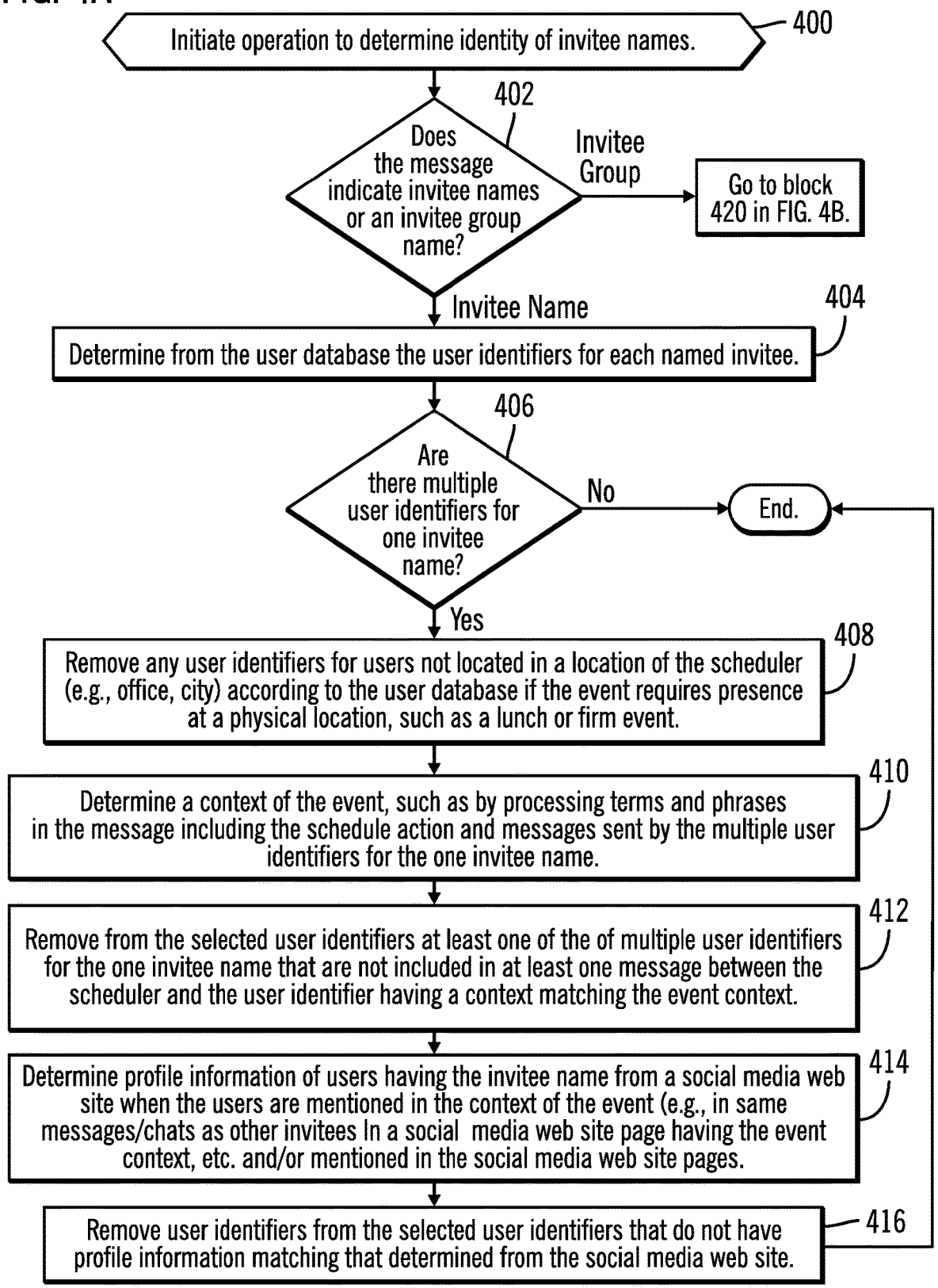

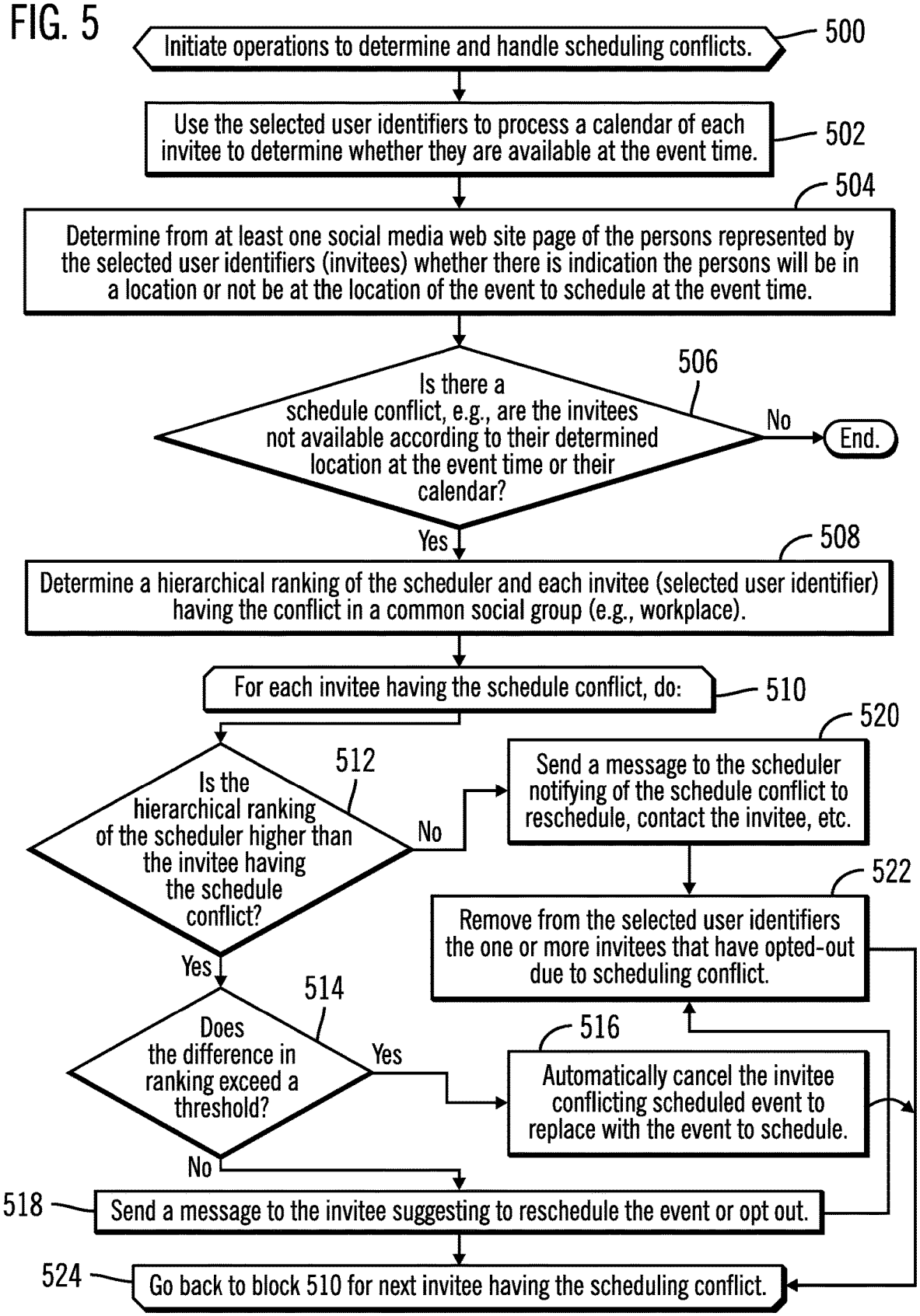

REMOVE SELECTED USER IDENTIFIERS TO INCLUDE IN AN EVENT MESSAGE BASED ON A CONTEXT OF AN EVENT

BACKGROUND OF THE INVENTION

1. Field of the Invention

The present invention relates to a computer program product, system, and method for scheduling events based on messages produced by a message program.

2. Description of the Related Art

Meetings are generally scheduled manually using a scheduler program, often incorporated within an email or communication program. Finding appropriate times that work in a work environment with acquaintances and co-workers located in different cites, telecommunicating, and having widely varying schedules can be difficult and time consuming. Often several iterations of communication (via email, chat messages) are required to find a time that is least objectionable.

SUMMARY

Provided are a method, system, and program for scheduling events based on messages produced by a message program. A message of a scheduler is scanned for terms including a schedule action, wherein the schedule action specifies an event to schedule including an event time and indication of invitee names. User identifiers are selected for the invitee names from a user database. A social media web site is scanned to determine at least one of profile information for the persons represented by the selected user identifiers and availability for the persons represented by the selected user identifiers at the event time. Information resulting from the scanning the social media web site is used to determine user identifiers to include or remove from the selected user identifiers to invite to the event. Calendars for the selected user identifiers in the user database are processed to determine availability at the event time for the selected user identifiers. An invitation message is generated to transmit to addresses for the selected user identifiers on behalf of the scheduler to attend the event at the event time.

BRIEF DESCRIPTION OF THE DRAWINGS

FIGS. 4a and 4b illustrate an embodiment of operations to select user identifiers for invitee names determined from a message expressing an event to schedule.

FIG. 5 illustrates an embodiment of operations to determine scheduling conflicts for selected user identifiers of invitees.

DETAILED DESCRIPTION

Described embodiments provide technologies that are able to detect an event to schedule from messages generated by a user, referred to as a scheduler, and then automatically scan local databases as well as external social media web sites to determine the invitees for the event to schedule, resolve scheduling conflicts for the invitees, and determine an event location. The described embodiments improve the efficiency of scheduling meetings to reduce the impact of the meetings on the invitees and select a time and location for the meeting based on the meeting parameters expressed in the message.

Described embodiments operate by scanning a message produced by a user messaging program for terms including a schedule action that specifies an event to schedule including an event time and indication of invitee names. User identifiers for the indicated invitee names are determined from a user database. Social media web sites are then scanned to determine at least one of profile information for the persons represented by the selected user identifiers and availability for the persons represented by the selected user identifiers at the event time. Information resulting from the scanning of the social media web sites is used to determine user identifiers to include or remove from the selected user identifiers to invite to the event. The calendars for the selected user identifiers, the pool of invitees, in the user database are then processed to determine availability at the event time. An invitation message is generated to transmit to addresses for the selected user identifiers on behalf of the scheduler to attend the event at the event time.

Figure 1:
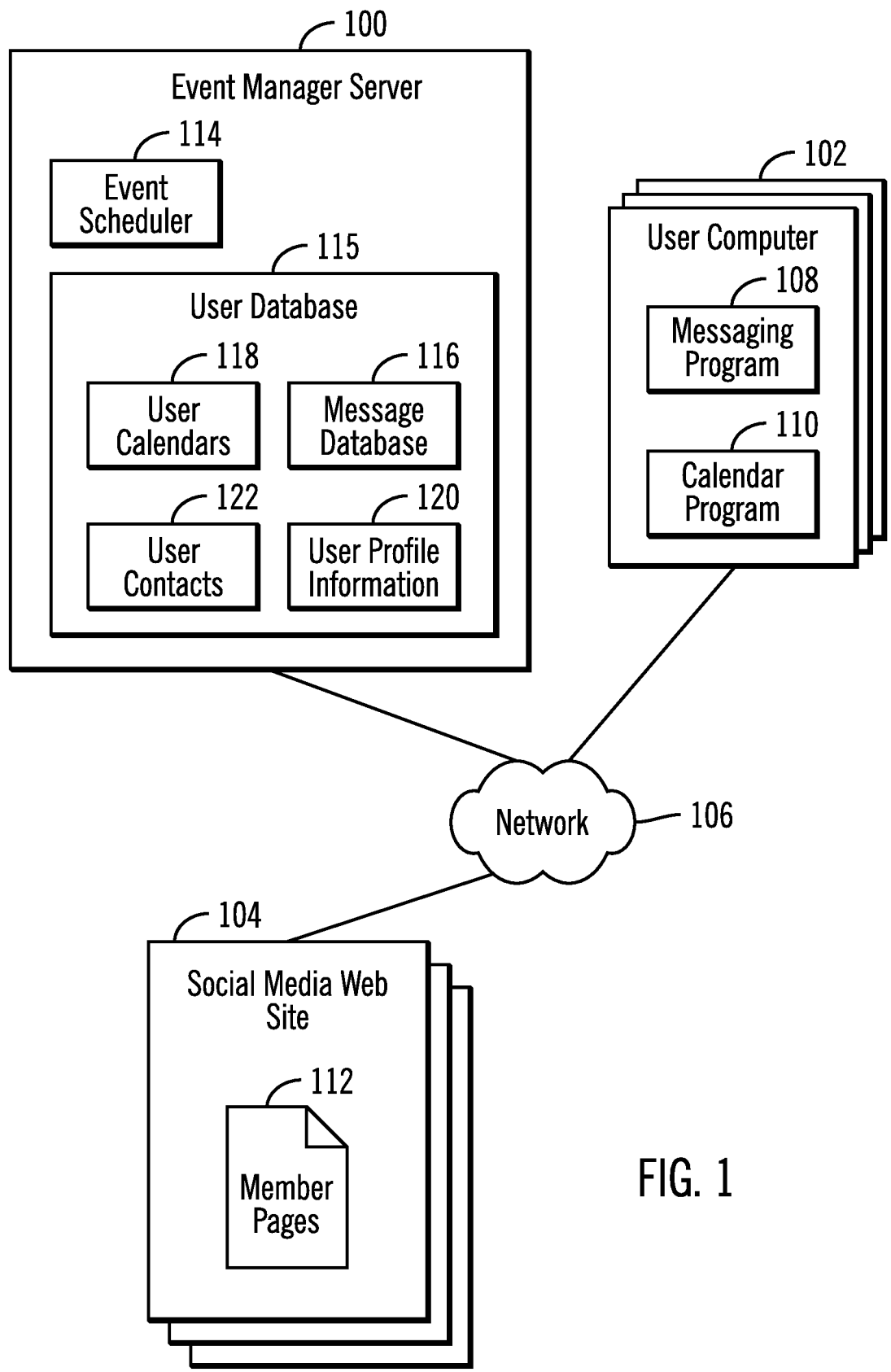
FIG. 1 illustrates an embodiment of a computing environment in which events are scheduled.

FIG. 1 illustrates an embodiment of a computing environment including an event manager server 100, one or more user computers 102, and one or more social media web sites 104 that communicate over a network 106. The user computers 102 may each include a messaging program 108, such as an email program, text messaging program, etc., and a calendar program 110 to manage scheduled events. The persons using the user computers 102 may also generate content in pages 112 in one or more social media web sites 104, such as third party social media web sites, e.g., Facebook®, YouTube®, Yelp®, etc., or social web sites and blogs maintained local in the user database 115, such as an in-house corporate blog for employees or members of an organization. (Facebook is a registered trademark of Facebook Inc., YouTube is a registered trademark of Google Inc., and Yelp is a registered trademark of Yelp Inc. throughout the world).

The event manager server 100 performs event scheduling for the user computers 102 and may include an event scheduler 114 to generate scheduled events and a user database 115 having information on users that are members of a common group that are provided computing services by the event manager server 100, such as a corporation, organization, subscription service, customers of a web service, subscribers to a cloud based web service providing scheduling services, etc. The user database 115 may include a message database 116 storing messages, e.g., emails, text messages, etc., produced by the messaging programs 108 of user members, a calendar database 118 storing the calendars for users identified in user profile information 120, and a contact database 122 storing contacts for users identified in the user profile information 120 that are using the user computers 102. Third party social media web sites 104 may maintain profile information for the users independent of the user profile information 120 as well as messages and information posted by the users on member pages 112.

In the embodiment of FIG. 1, the event scheduler 114 is shown located on the event management server 100. In an alternative embodiment, the event scheduler 114 may be implemented in part or whole on the user computers 102. In such alternative embodiments, the event scheduler 114 may interact with the server 100 to obtain information on other user calendar schedules and profiles.

In one embodiment, the event manager server 100 may be deployed by an organization, such as a corporation, government body, non-profit organization, web service, social group, etc., and the user profile information 120 has information on registered users of the group or organization, where the profile information 120 includes a unique identifier of each user, as well as personal and organizational related information, such as contact information, position in the organization, hierarchical position in the organization with respect to other users, work location, residence location, etc.

Figure 2:
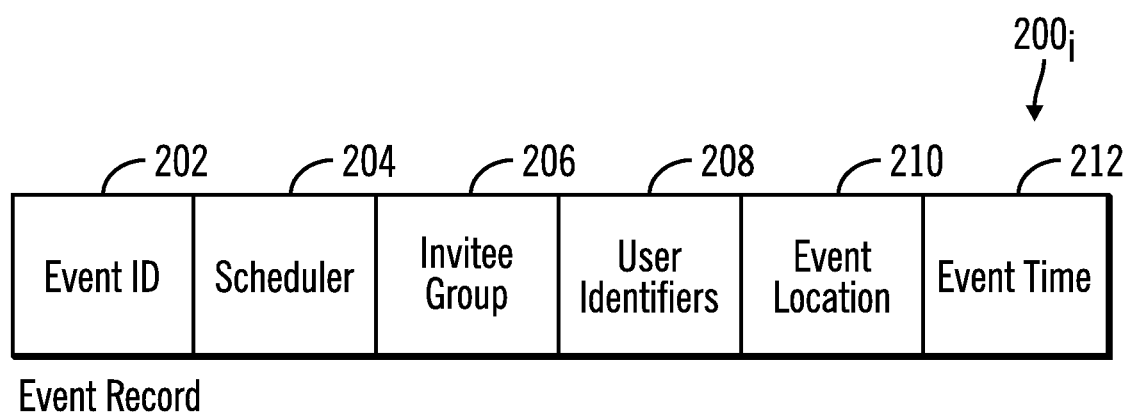
FIG. 2 illustrates an embodiment of an event record.

The event scheduler 114 processes messages from user messaging programs 108 to generate scheduled events to be included in the calendars in the calendar database 118 for the different users. FIG. 2 illustrates an embodiment of an event record 200, such as a calendar event, the event scheduler 114 may generate for one event comprising an event identifier (ID) 202, a scheduler 204 comprising an identifier of the user that generated the message triggering the event creation, an invitee group 206, which may comprise a group name defined in the contact database 122 and user profile information 120; selected user identifiers 208 comprising the unique identifiers of the users in the organization invited to the event, an event location 210 at which the event will be located, and an event time 212.

Figure 3:
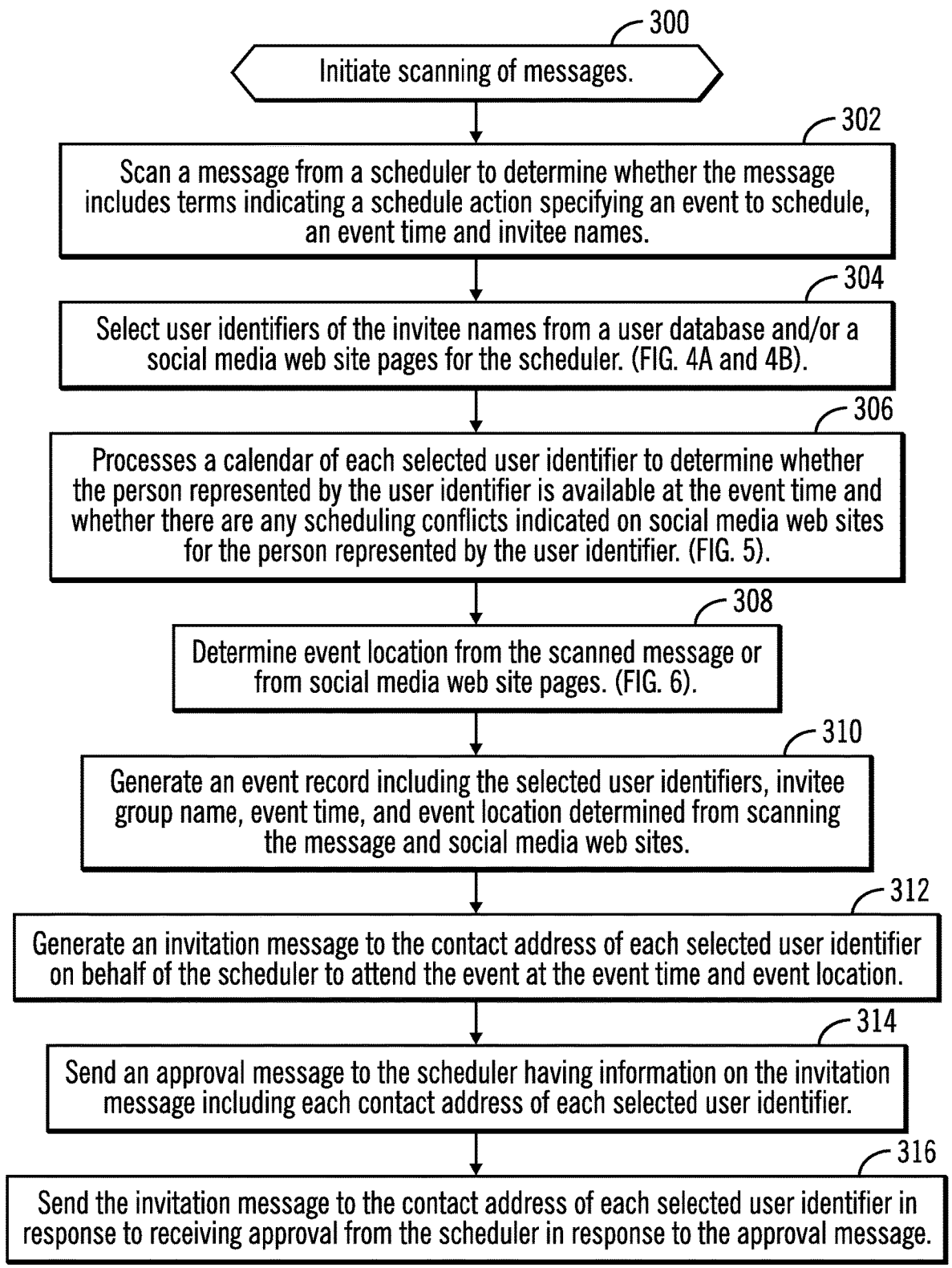
FIG. 3 illustrates an embodiment of operations to scan messages to generate scheduled events.

FIG. 3 illustrates an embodiment of operations performed by the event scheduler 114 to scan messages from the user messaging programs 108 of users to determine whether to generate a scheduled event for invitee calendars maintained in the calendar database 118. Upon initiating (at block 300) the scanning of messages, the event scheduler 114 scans (at block 302) a message from a user at a user computer 104, referred to herein as a "scheduler", to determine whether the message includes terms indicating a schedule action specifying an event to schedule, an event time 212 and invitee names. The invitee names may be indicated directly as a list of one or more names and/or comprise an invitee group name. An invitee group may 206 may comprise a group name that maps to one or more users or individual user names in the user database 115 when a group name is specified in the message. The event scheduler 114 may scan the text of the message, which may be free form, for keywords, including misspellings, and for regular expressions and variations of regular expressions denoting scheduling terms. For instance, to recognize a meeting needs to be scheduled from terms in a message, an ontology of expressions can be set up to capture synonyms of "meeting", "meetings", "schedule", "schedules" (and misspelt versions). The unstructured data can be scanned sequentially for the words/phrases belonging to the ontology. The dictionary will grow over time with a few key words and phrases seeded first. Examples of regular expressions to capture include: "meeting", "meetings", "Meeting", "Meetings", "let's meet", "book a room", etc. A basic ontology of regular expressions and words that reflect date and time can be used to identify meetings, e.g., "Are you free on {12 Jan. 2015}?", "Let's catch up on {12 Jan. 2015} at {Cafe}", etc.

Figure 4B:
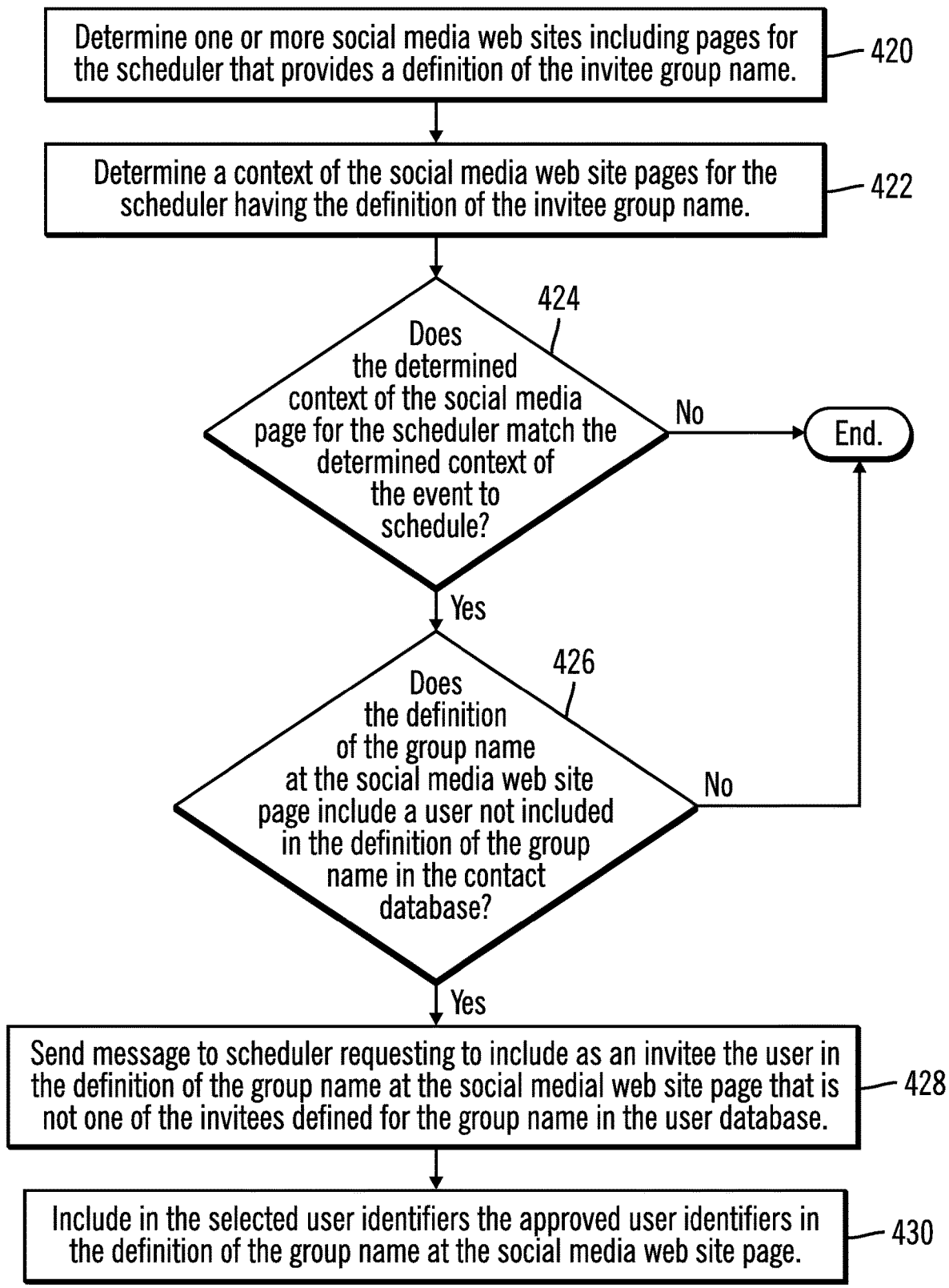

The event scheduler 114 may then select (at block 304) user identifiers for the invitee names determined in the message from the user database 115, such as the user profile information 120, and/or a social media web site pages 112 for the scheduler. FIGS. 4a and 4b provide further details on the operation at block 304 to select the user identifiers for the invitee names. The invitee names may be determined by scanning the message for keywords such references to individual invitees by name or to groups of invitees, e.g., "group x", "distribution x", "Team x", etc., to allow for contact group names to be pulled from the contact database 122 as well as social media web sites 104.

The event scheduler 114 then processes (at block 306) a calendar in the user calendars 118 for each selected user identifier to determine whether the person represented by the selected user identifier is available at the event time and whether there are any scheduling conflicts indicated in social media web site pages 104 for the person represented by the selected user identifier. FIG. 5 provides further embodiments and details on how to handle scheduling conflicts for the selected user identifiers/invitees.

Figure 6:
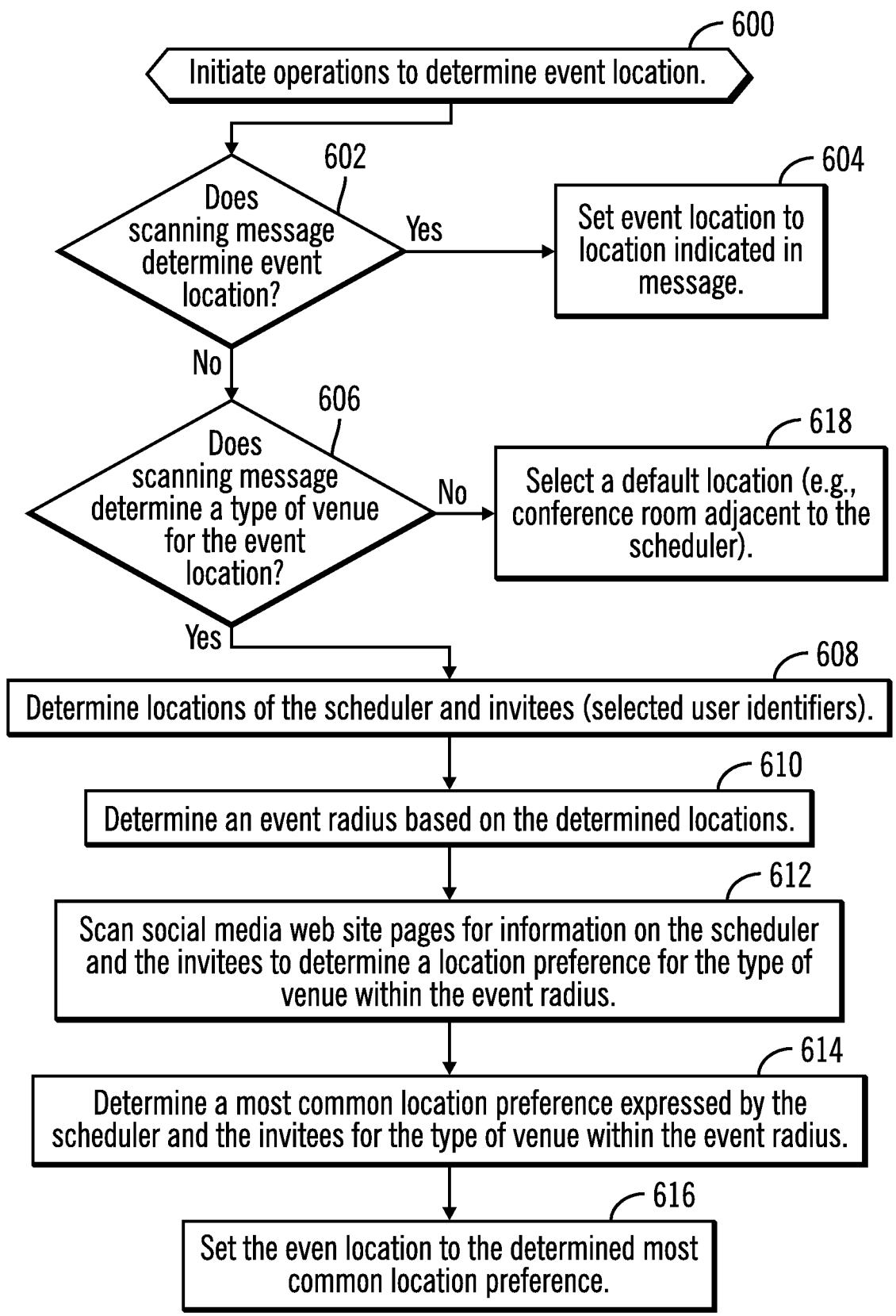
FIG. 6 illustrates an embodiment of operations to determine an event location for the event scheduled from the message.

The event scheduler 114 may also scan the message to determine (at block 308) an event location 210. The event location may also be determined or supplemented from social media web sites 104 having pages 112 for the selected user identifiers, also referred to as invitees, and the scheduler. FIG. 6 provides further details on the operations to determine the event location.

An event record 200 may then be generated (at block 310) to include the user ID of the scheduler 204, invitee group 206 if specified in message, invitee user IDs 208, event location 210, and event time 212, determined from scanning the message and processing information in the local databases 118, 120, and 122 as well as pulling information from social media web sites 104. For instance, the event scheduler 114 may gather information from external social media web site 104 groups, such as What'sApp® groups, Facebook® groups, Google+® Circles, etc. (What'sApp is registered a trademark of WhatsApp Inc., Google+ is a registered trademark of Google Inc. throughout the world).

An invitation message is generated (at block 312) to the contact address of each invitee (user identifier) on behalf of the scheduler to attend the event at the event time 212 and event location 210. The event scheduler 114 then sends (at block 314) an approval message to the scheduler, e.g., email address or text message, having information on the invitation message including each contact address of each determined invitee. The event scheduler 114 may then send (at block 316) the invitation message to the contact addresses of the invitees (selected user identifiers) in response to receiving approval from the scheduler in response to the approval message. The invitation message may include code to allow the invitee through the message to automatically update their calendar information in the calendar database 118 to reflect the scheduled event. Alternatively, the event may be automatically scheduled in the invitee calendars in the calendar database 118, and the invitation message may inform the invitees that such scheduling has occurred.

FIGS. 4a and 4b illustrate an embodiment of operations performed by the event scheduler 114 to perform the operation at block 304 to identify the selected user identifiers, i.e., invitees. Upon initiating the operation (at block 400) to determine the selected user identifiers for the invitee names determined by scanning the message, if (at block 402) the message indicates invitee names (as opposed to an invitee group name), the event scheduler 114 determines (at block 404) from the user database 115, such as from the user profile information 120 and/or contact database 122 the user identifier for each named invitee. If (at block 406) there are multiple user identifiers determined for one invitee name, then the event scheduler 114 removes (at block 408) any user identifiers for the one invitee name having multiple user identifiers that are not located in a location of the scheduler (e.g., office, city) according to the user database 114 if the event is to take place at a physical location.

To further determine multiple user identifiers to remove, the event scheduler 114 may determine (at block 410) a context of the event, such as by processing terms and phrases in the message including the schedule action and messages sent by the multiple user identifiers for the one invitee name. The context may be determined by looking for keywords that indicate whether the context is work, a particular area of work, a particular division or work subject matter, personal, etc. The event scheduler 114 may then remove (at block 412) from the selected user identifiers at least one of the of multiple user identifiers for the one invitee name that are not included in at least one message between the scheduler and the person represented by the user identifier having a context matching the determined event context, i.e., a work context, personal context, etc. The event scheduler 114 may further scan social media web site 104 pages 112 having the invitee name with multiple user identifiers to determine (at block 414) whether the invitee name is mentioned in the context of the event (e.g., in same messages/chats as other invitees in a social media web site page having the event context, etc.) If the invitee name is mentioned at the social media web site 104 in the context of the event, then the event scheduler 114 may determine (at block 414) user profile information from the social media web site 104 for that invitee name, such as personal information on the invitee name that can be used to identify the person. The event scheduler 114 may then remove (at block 416) user identifiers for the one invitee name from the selected user identifiers that do not have profile information in the user profile information 120 that matches the user profile information determined from the social media web site 104. For instance, if the user profile information 120 in the user database 114 for one user identifier indicates a birthdate that is different from the birthday at the social media web site 104, that user identifier with the incorrect birthdate may be removed from the selected user identifiers comprising the invitees for the event.

In certain embodiments determining whether the context matches between the message and the social media web site 104 may comprise determining whether the terms and phrases in the messages involving the selected user identifiers match the terms and phrases used at the social media web site 104 having the definition of the invitee group name.

If (at block 402) the message indicates an invitee group name, the event scheduler 114 proceeds to block 420 in FIG. 4b to determine one or more social media web sites 104 including pages 112 for the scheduler that provides a definition of the invitee group name. The group name used at the social media web site 104 may be determined to match the invitee group name determined from the message as an exact match or a partial match determined by stemming. The event scheduler 114 may then determine (at block 422) the context of the social media web site pages 112 mentioning the invitee group name, e.g., work related, related to a specific activity or subject matter, etc.

If (at block 424) the determined context of the social media web page 112 mentioning the invitee group name matches the determined context of the event to schedule, then the event scheduler 114 determines (at block 426) whether the definition of the group name at the social media web site page 112 includes a person or user not included in the definition of the group name in the user database 115. If so, then the event scheduler 114 may send (at block 428) a message to the scheduler requesting to include the located new user as an invitee to supplement the invitees/user identifiers defined in the user database 115 for the group name. The event scheduler 114 may then include (at block 430) in the selected user identifiers, i.e., invitees, the approved user identifiers in the definition of the group name at the social media web site page.

If a scanned message includes both invitee names and an invitee group name, then the operations from block 404 and 420 would be separately performed for mentioned invitee names and invitee group names, respectively.

With the operations of FIGS. 4a and 4b, the event scheduler 114 determines how to add or remove user identifiers from a group of selected user identifiers based on information at social media web sites, such as profile information on persons represented by the selected user identifiers for invitee names or a context in which persons or a group name are mentioned in the social media web site. This allows the event scheduler 114 to build a more accurate list of invitees, such as resolving the case when there are multiple user identifiers determined for one invitee name or to find group names defined on the social media web sites matching the group name in a scheduling message that may have users who should be considered for inclusion in the group of selected user identifiers/invitees.

FIG. 5 illustrates an embodiment of operations performed by the event scheduler 114 to perform the operation at block 306 to resolve scheduling conflicts for the selected user identifiers. Upon initiating (at block 500) operations to determine scheduling conflicts, the event scheduler 114 uses (at block 502) the selected user identifiers to process a calendar of each invitee/user identifier in the user calendars 118 to determine whether they are available at the event time. The event scheduler 114 may further access and query at least one social media web site page 112 1 of the person represented by the selected user identifiers, i.e., the invitee, to determine (at block 504) whether there is indication that the persons (user identifiers) will be in a location or not be at the location of the event to schedule at the event time. A schedule conflict is determined (at block 506) if any of the selected user identifiers are not available according to their determined location from the social media web sites 104 or if their calendar in the calendar database 118 indicates a conflict. If there is a schedule conflict for one or more invitees (selected user identifiers), then the event scheduler 114 determines (at block 508) a hierarchical ranking of the scheduler and each invitee having the conflict in a common group of the users in the user database 115. The hierarchical ranking may be based on a title, number of people that report to the scheduler and selected user identifiers, or any other measure of importance in the common group.

The event scheduler 114 performs a loop of operations at block 510 through 524 for each invitee (selected user identifier) having the schedule conflict with the scheduler. If (at block 512) the hierarchical ranking of the scheduler is higher than the invitee with the schedule conflict, then a determination is made (at block 514) if the difference of the ranking exceeds a threshold, in terms of number of levels of superiority or management the scheduler holds over the invitee. If (at block 514) the difference in ranking exceeds a threshold, then the event scheduler 114 automatically cancels (at block 516) the invitee conflicting scheduled event to replace with the event to schedule by the significantly higher ranking scheduler. In this way, the much lower ranked invitee has their scheduled event automatically canceled in favor of the much higher ranked scheduler. If (at block 514) the difference in ranking does not exceed the threshold, then a message is sent (at block 518) to the invitee (user identifier) suggesting to reschedule their scheduled event or opt out of the scheduler initiated event.

If (at block 512) the hierarchical ranking of the invitee is higher than that of the scheduler, then a message is sent (at block 520) to the scheduler notifying them of the schedule conflict to allow them to reschedule, contact the invitee, etc. If rescheduling suggestions have been sent in messages (at block 518 or 520) to the invitee or scheduler, then the event scheduler 114 may remove (at block 522) from the selected user identifiers the invitee that opted-out of the scheduled event due to the scheduling conflict.

With the embodiment of FIG. 5, different factors may be used to determine invitees to remove from the group of selected user identifiers/invitees based on scheduling conflicts determined by considering the user identifier calendar maintained in the user database 115, from information on the schedule of invitees gleaned from social media web sites 114 and/or the relative social ranking of the scheduler and invitee. Alternatively, the invitee or scheduler may be given the opportunity to remove the invitee from the scheduled event.

In further embodiments, the event to schedule may have an assigned value as to importance. This value along with importance values of attendees may be used to determine conflict resolution by rescheduling the event having the lowest score when multiple events conflict with the time of the event to schedule. The overall score of events may be based on the event value and ranking of invitees for the event.

FIG. 6 illustrates an embodiment of operations performed by the event scheduler 114 to determine an event location from the content of the message or social media websites to perform the operation at block 308 in in FIG. 3. Upon initiating (at block 600) operations to determine the event location, the event scheduler 114 determines (at block 602) whether scanning the message yielded an event location. If so, the determined event location is set (at block 604) in field 210 of the event record $200_i$. Otherwise, if (from the no branch of block 602) the event location could not be determined from the message, a determination is made (at block 606) whether the message indicates a type of venue. For instance, the message may say "let's go for vegan food". Alternatively the message may indicate that the venue should be related to a type of suggested activity, e.g., team building, cocktail party, day at the beach, etc.

If (at block 606) a type of venue is specified, then the event scheduler 114 determines (at block 608) locations of the scheduler and invitees (selected user identifiers), such as home or work depending on event time, and an event radius based on the determined locations (at block 610), e.g., encompassing the determined locations. The event scheduler 114 may then scan (at block 612) social media web site pages 112 for information on the scheduler and the invitees to determine a location preference for the type of venue within the event radius. For instance, the event scheduler 114 may determine if social media web site pages 112 specify for the scheduler and invitees expressions of approval for specific or types of venue related to the type of venue expressed in the message, e.g., type of food preference, activity preference for messages indicating an activity for the event location, etc.

After gathering information on the invitee and scheduler preferences for the type of venue suggested in the scheduler message, the event scheduler 114 may determine (at block 614) a most common location preference expressed by the scheduler and the invitees for the indicated type of venue within the event radius. The event scheduler 114 may use a web service, such as Tripadvisor®, Yelp®, etc. (Tripadvisor is a registered trademark of TripAdvisor LLC throughout the world), to determine a specific location for the common expressed location preference if the common expressed location preference comprises a type of location instead of a specific locale. The event location 210 in the event record $200_i$ being generated is set (at block 616) to the determined event location. If (at block 606) the message did not indicate a type of venue as well, then the event location 210 may be set to a default location, such as a conference room adjacent to the scheduler, etc.

With the described embodiment of FIG. 6, social media web sites may be processed to determine a preferred event location for the event based on the scheduler and invitees expression of preferences for a location at social media web pages.

In further embodiments, there may be locality based reminders. If a predefined percentage of the invitees are determined to be within a range of coordinates including the event location, an alert can be sent out to those invitees not located at the event location coordinates on the event status. An alert may also be generated to the invitees that are within the event location coordinates providing information on invitees who are still travelling using tracking information from the travelling invitee's cellular device, such as their estimated time of arrival, which may be computed using mapping information and the travelling invitee location.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
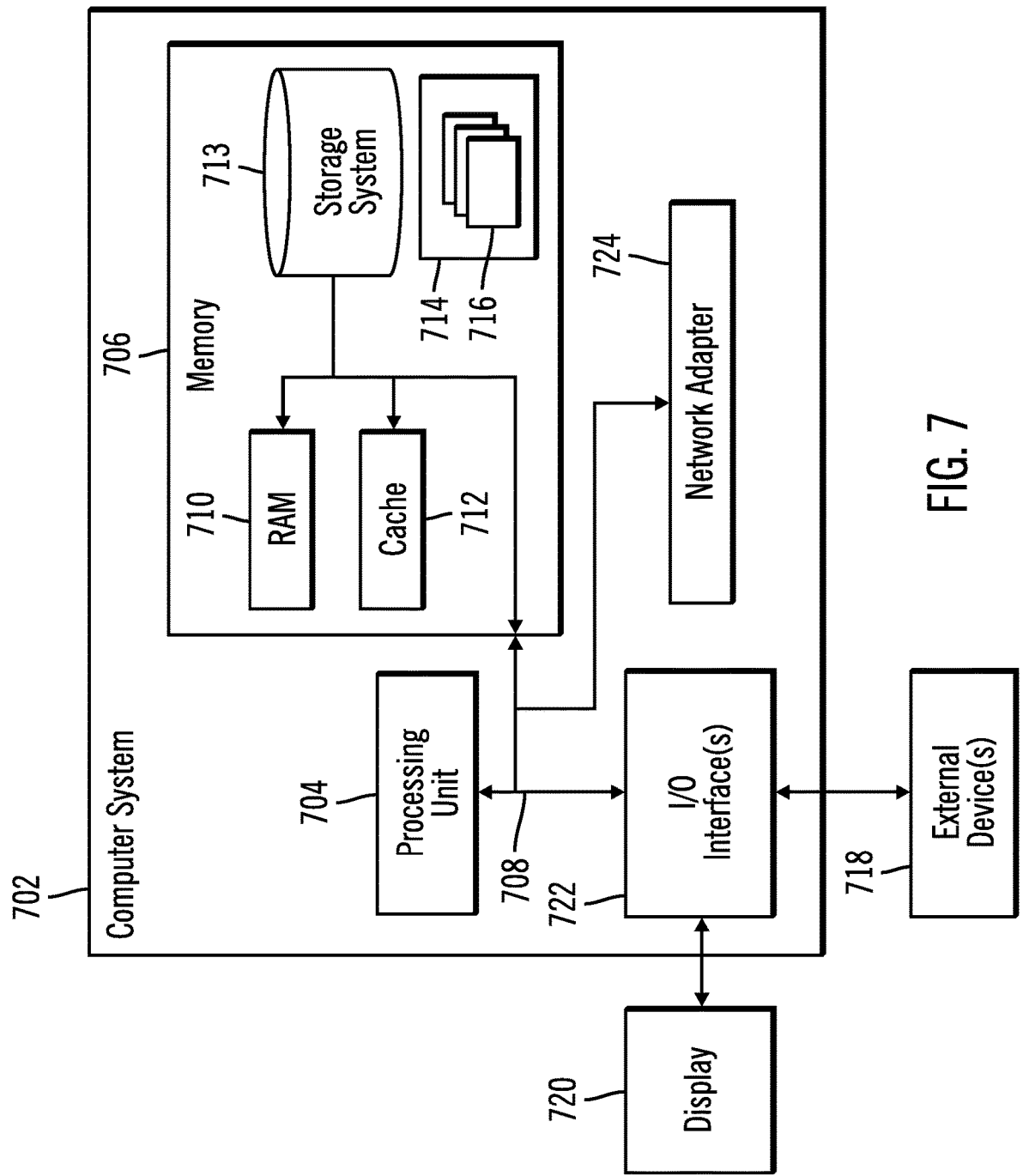
FIG. 7 illustrates a computing environment in which the components of FIG. 1 may be implemented.

The computational components of FIG. 1, including the event manager server 100, user computers 102 and social media web sites 104 may each be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The reference characters used herein, such as i, are used herein to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for generating an event message, wherein the computer program product comprises a computer readable storage medium having program instructions embodied therewith, the program instructions executable by a processor to cause operations, the operations comprising:

processing a message, sent by an event initiator for an event to schedule, to determine whether the message includes expressions and variations of expressions included in an ontology of expressions for a meeting;

in response to determining that the message comprises an event message including expressions included in the ontology of expressions for a meeting, scanning the message for keywords comprising references to invitees;

determining multiple user identifiers in a user database for the invitees identified in the message;

determining a context of the event to schedule by processing terms and phrases in the message sent to schedule the event;

determining context of messages sent by the multiple user identifiers to the event initiator, wherein the context of the messages sent by the multiple user identifiers is determined by searching for keywords in the messages, sent by the multiple user identifiers, indicative of a context category;

sending a message to reschedule to at least one of the event initiator and at least one of the multiple user identifiers having a scheduling conflict with the event to schedule based on a comparison of hierarchical rankings of the event initiator and the at least one of the multiple user identifiers having the scheduling conflict;

producing a modified group of user identifiers comprising at least one of the multiple user identifiers that sent one of the messages to the event initiator having a message context matching the determined context of the event to schedule, wherein the modified group of user identifiers do not include user identifiers of users having a higher hierarchical ranking than the event initiator that indicated to opt out of the event to schedule in response to receiving the message to reschedule; and generating an event message to transmit to addresses for the modified group of user identifiers with information on the event to schedule.

2. The computer program product of claim 1, wherein the operations further comprise:
   determining a social media web site indicating an invitee name, from the message sent by the event initiator, having multiple user identifiers in the user database;
   determining, from the social media web site, profile information for at least one person having the invitee name having the multiple user identifiers; and
   removing, from the modified group of user identifiers, at least one of the multiple user identifiers for the invitee name that do not have profile information in the user database that matches the profile information determined from the social media web site.

3. The computer program product of claim 1, wherein the event to schedule includes an event group name, wherein the operations further comprise:
   determining user identifiers from a definition for the event group name in the user database;
   determining that a social media web site provides a definition of the event group name that includes a person name not identified in the definition of the event group name in the user database; and
   determining a user identifier for the person name from the user database, wherein the modified group of user identifiers include the determined user identifier for the person name.

4. The computer program product of claim 3, wherein the determined context of the event to schedule comprises at least one of a personal context and a work context, wherein the operations further comprise
   determining a context of the social media web site having information about the event initiator; and
   determining whether the determined context of the social media web site matches the determined context of the event to schedule, wherein the person name in the definition of the event group name at the social media web site is included in the modified group of user identifiers when the context of the social media web site matches the determined context of the event.

5. The computer program product of claim 4, wherein determining whether the context of the social media web site matches the determined context of the event to schedule comprises determining whether terms and phrases in messages including the multiple user identifiers match words and phrases used at the social media web site having the definition of the event group name.

6. The computer program product of claim 1, wherein the operations further comprise:
   sending a message to the user identifiers having the schedule conflict to reschedule the schedule conflict in response to determining that the event initiator has a higher hierarchical ranking in a social group than the user identifiers having the schedule conflict; and
   sending a message to the event initiator to reschedule the event in response to determining that the event initiator has a lower hierarchical ranking in the social group than the user identifiers having the schedule conflict.

7. The computer program product of claim 6, wherein the social group comprises a work organization, and wherein the hierarchical ranking are determined from at least one of a title and number of people reporting to the event initiator and persons represented by the multiple user identifiers.

8. The computer program product of claim 1, wherein the operations further comprise:
   determining from the message, sent by the event initiator, that the event to schedule is at a type of venue;
   scanning a social media web site for information on the event initiator and the multiple user identifiers to determine a location preference for the type of venue; and
   determining a most common location preference expressed by the event initiator and persons represented by the multiple user identifiers for the type of venue, wherein the event message indicates the most common location preference as a venue for the event to schedule.

9. The computer program product of claim 8, wherein the operations further comprise:
   in response to the most common location preference comprising a preferred type of venue, performing:
      determining a location of the event initiator and the persons represented by the multiple user identifiers; and
      determining an event radius based on the determined location, wherein the most common location preference is determined from location preferences within the event radius.

10. The computer program product of claim 1, wherein the operations further comprise:
   sending an approval message to the event initiator having information on the event message including each contact address for each user identifier in the modified group of user identifiers; and
   sending the event message to the contact addresses in response to receiving approval from the event initiator in response to the approval message.

11. The computer program product of claim 1, wherein the operations further comprise:
   scanning a social media web site to determine profile information for persons represented by the multiple user identifiers and availability for the persons represented by the multiple user identifiers at an event time; and
   using information resulting from the scanning the social media web site to determine user identifiers to include or remove from the modified group of user identifiers for the event to schedule.

12. The computer program product of claim 11, wherein the scanning the social media web site to determine the availability for the persons represented by the multiple user identifiers at an event time comprises:
   determining from the social media web site whether each of the persons represented by the multiple user identifiers will be in a location of the event to schedule at the event time, wherein the modified group of user identifiers include only those user identifiers that are determined to be in the location of the event at the event time.

13. A system for scheduling a calendar event for users, comprising:
   a processor; and
   a computer readable storage medium having program code executed by the processor to perform operations, the operations comprising:

processing a message, sent by an event initiator for an event to schedule, to determine whether the message includes expressions and variations of expressions included in an ontology of expressions for a meeting;

in response to determining that the message comprises an event message including expressions included in the ontology of expressions for a meeting, scanning the message for keywords comprising references to invitees;

determining multiple user identifiers in a user database for the invitees identified in the message;

determining a context of the event to schedule by processing terms and phrases in the message sent to schedule the event;

determining context of messages sent by the multiple user identifiers to the event initiator, wherein the context of the messages sent by the multiple user identifiers is determined by searching for keywords in the messages sent by the multiple user identifiers indicative of a context category;

sending a message to reschedule to at least one of the event initiator and at least one of the multiple user identifiers having a scheduling conflict with the event to schedule based on a comparison of hierarchical rankings of the event initiator and the at least one of the multiple user identifiers having the scheduling conflict;

producing a modified group of user identifiers comprising at least one of the multiple user identifiers that sent one of the messages to the event initiator having a message context matching the determined context of the event to schedule, wherein the modified group of user identifiers do not include user identifiers of users having a higher hierarchical ranking than the event initiator that indicated to opt out of the event to schedule in response to receiving the message to reschedule; and generating an event message to transmit to addresses for the modified group of user identifiers with information on the event to schedule.

14. The system of claim 13, wherein the operations further comprise:

determining a social media web site indicating an invitee name, from the message sent by the event initiator, having multiple user identifiers in the user database;

determining, from the social media web site, profile information for at least one person having the invitee name having the multiple user identifiers; and removing, from the modified group of user identifiers, at least one of the multiple user identifiers for the invitee name that do not have profile information in the user database that matches the profile information determined from the social media web site.

15. The system of claim 13, wherein the message indicates an event group name, wherein the operations further comprise:

determining user identifiers from a definition for the event group name in the user database;

determining that a social media web site provides a definition of the event group name that includes a person name not identified in the definition of the event group name in the user database; and determining a user identifier for the person name from the user database, wherein the modified group of user identifiers include the determined user identifier for the person name.

16. The system of claim 13, wherein the operations further comprise:

sending a message to the user identifiers having the schedule conflict to reschedule the schedule conflict in response to determining that the event initiator has a higher hierarchical ranking in a social group than the user identifiers having the schedule conflict; and sending a message to the event initiator to reschedule the event in response to determining that the event initiator has a lower hierarchical ranking in the social group than the user identifiers having the schedule conflict.

17. The system of claim 13, wherein the operations further comprise:

determining from the message, sent by the event initiator, that the event to schedule is at a type of venue;

scanning a social media web site for information on the event initiator and the multiple user identifiers to determine a location preference for the type of venue; and determining a most common location preference expressed by the event initiator and persons represented by the multiple user identifiers for the type of venue, wherein the event message indicates the most common location preference as a venue for the event to schedule.

18. The system of claim 13, wherein the operations further comprise:

scanning a social media web site to determine profile information for persons represented by the multiple user identifiers and availability for the persons represented by the multiple user identifiers at an event time; and using information resulting from the scanning the social media web site to determine user identifiers to include or remove from the modified group of user identifiers for the event to schedule.

19. A method for scheduling a calendar event in a computer system, comprising:

processing a message, sent by an event initiator for an event to schedule, to determine whether the message includes expressions and variations of expressions included in an ontology of expressions for a meeting;

in response to determining that the message comprises an event message including expressions included in the ontology of expressions for a meeting, scanning the message for keywords comprising references to invitees;

determining multiple user identifiers in a user database for the invitees identified in the message;

determining a context of the event to schedule by processing terms and phrases in the message sent to schedule the event;

determining context of messages sent by the multiple user identifiers to the event initiator, wherein the context of the messages sent by the multiple user identifiers is determined by searching for keywords in the messages, sent by the multiple user identifiers, indicative of a context category;

sending a message to reschedule to at least one of the event initiator and at least one of the multiple user identifiers having a scheduling conflict with the event to schedule based on a comparison of hierarchical rankings of the event initiator and the at least one of the multiple user identifiers having the scheduling conflict;

producing a modified group of user identifiers comprising at least one of the multiple user identifiers sent one of the messages to the event initiator having a message context matching the determined context of the event to schedule, wherein the modified group of user identifiers do not include user identifiers of users having a higher hierarchical ranking than the event initiator that indicated to opt out of the event to schedule in response to receiving the message to reschedule; and generating an event message to transmit to addresses for the modified group of user identifiers with information the event to schedule.

20. The method of claim 19, further comprising:

determining a social media web site indicating an invitee name, from the message sent by the event initiator, having multiple user identifiers in the user database;

determining, from the social media web site, profile information for at least one person having the invitee name having the multiple user identifiers; and removing, from the modified group of user identifiers, at least one of the multiple user identifiers for the invitee name that do not have profile information in the user database that matches the profile information determined from the social media web site.

21. The method of claim 19, wherein the event to schedule includes an event group name, further comprising:

determining user identifiers from a definition for the event group name in the user database;

determining that a social media web site provides a definition of the event group name that includes a person name not identified in the definition of the event group name in the user database; and determining a user identifier for the person name from the user database, wherein the modified group of user identifiers include the determined user identifier for the person name.

22. The method of claim 19, further comprising:

sending a message to the user identifiers having the schedule conflict to reschedule the schedule conflict in response to determining that the event initiator has a higher hierarchical ranking in a social group than the user identifiers having the schedule conflict; and sending a message to the event initiator to reschedule the event in response to determining that the event initiator has a lower hierarchical ranking in the social group than the user identifiers having the schedule conflict.

23. The method of claim 19, further comprising:

determining from the message, sent by the event initiator, that the event to schedule is at a type of venue;

scanning a social media web site for information on the event initiator and the multiple user identifiers to determine a location preference for the type of venue; and determining a most common location preference expressed by the event initiator and persons represented by the multiple user identifiers for the type of venue, wherein the event message indicates the most common location preference as a venue for the event to schedule.

24. The method of claim 19, further comprising:

scanning a social media web site to determine profile information for persons represented by the multiple user identifiers and availability for the persons represented by the multiple user identifiers at an event time; and using information resulting from the scanning the social media web site to determine user identifiers to include or remove from the modified group of user identifiers for the event to schedule.

* * * * *